(12) United States Patent
Altman et al.

(10) Patent No.: US 7,939,150 B2
(45) Date of Patent: May 10, 2011

(54) LID STOCK USING ORIENTED FLUOROPOLYMERS

(75) Inventors: Carl E. Altman, Pitman, PA (US); John B. Blum, Middletown, DE (US)

(73) Assignee: Honeywell International Inc., Morristown, NJ (US)

( * ) Notice: Subject to any disclaimer, the term of this patent is extended or adjusted under 35 U.S.C. 154(b) by 849 days.

(21) Appl. No.: 11/204,853

(22) Filed: Aug. 16, 2005

(65) Prior Publication Data

US 2007/0042147 A1    Feb. 22, 2007

(51) Int. Cl.
*B32B 27/00* (2006.01)
*B65D 1/00* (2006.01)
*B65B 51/10* (2006.01)
*B65B 7/00* (2006.01)
*B67B 6/00* (2006.01)

(52) U.S. Cl. ...... 428/36.6; 428/34.1; 428/35.4; 428/35.5; 428/35.7; 428/36.92; 53/478; 53/485; 156/69

(58) Field of Classification Search .......... 428/34.1, 428/34.8, 34.9, 35.1, 35.2, 35.4, 35.5, 35.7, 428/36.6, 36.7, 36.92, 411.1, 421, 474.4, 428/476.3, 476.9, 480, 500; 53/478, 485; 156/69
See application file for complete search history.

(56) References Cited

U.S. PATENT DOCUMENTS

| 4,581,267 | A | * | 4/1986 | Miller ........................... 428/40.6 |
| 4,659,625 | A | | 4/1987 | Decroly et al. ............... 428/412 |
| 4,677,017 | A | | 6/1987 | DeAntonis et al. ........... 428/214 |
| 5,139,878 | A | | 8/1992 | Kim et al. ..................... 428/421 |
| 5,342,673 | A | * | 8/1994 | Bowman et al. .............. 428/198 |
| 5,655,706 | A | | 8/1997 | Vandiver |
| 5,833,070 | A | * | 11/1998 | Mizuno et al. ............. 206/524.4 |
| 5,945,221 | A | | 8/1999 | Tsai et al. ..................... 428/412 |
| 6,306,503 | B1 | | 10/2001 | Tsai .............................. 428/412 |
| 6,432,542 | B1 | | 8/2002 | Tsai .............................. 428/421 |
| 6,465,103 | B2 | | 10/2002 | Tsai et al. ..................... 428/422 |
| 6,555,190 | B1 | | 4/2003 | Tsai .............................. 428/36.6 |
| 2005/0072783 | A1 | | 4/2005 | Choi |

FOREIGN PATENT DOCUMENTS

| WO | WO 99/24256 A | 5/1999 |
| WO | WO 2004/069533 A | 8/2004 |

* cited by examiner

*Primary Examiner* — Walter B Aughenbaugh
(74) *Attorney, Agent, or Firm* — Carrie Beatus

(57) ABSTRACT

Fluoropolymer-containing lidding films for food, non-food and medical packages, including a two-piece sealed package having container and lid portions that are readily separable from each other. Thin, transparent films may be formed having excellent barrier properties suitable for packaging applications, particularly blister packaging.

16 Claims, No Drawings

US 7,939,150 B2

LID STOCK USING ORIENTED FLUOROPOLYMERS

BACKGROUND OF THE INVENTION

1. Field of the Invention

The invention relates to fluoropolymer-containing lidding films for food, non-food and medical packages. More particularly, the invention pertains to a two-piece sealed package, including container and lid portions, which are separable from each other.

2. Description of the Related Art

It is well known in the art to provide containers such as tubs, cups, jars and pails which are useful for packaging, distributing and serving food, non-food and medical items. Typically, such containers are provided with a lid material, which seals its opening and yet is easily peeled off for access to the container contents. The lids are usually made from multilayer sheets which are die cut into a desired shape or heat sealed to a base cup stock then die cut as the final process of the packaging operation.

Many lids are made of one or more layers of polymers in order to achieve certain desired properties, particularly moisture and oxygen barrier properties. For example, a multilayered lidding film may have one polymer layer that serves as a water or solvent barrier and a second polymer layer that serves as an oxygen or air barrier. A typical moisture or solvent barrier polymer is a polyolefin such as polypropylene or polyethylene and a typical oxygen barrier polymer is a polyvinyl alcohol, an ethylene vinyl alcohol copolymer, a polyvinylidene chloride, a nylon, a polyacrylonitrile or a polyester. It is also known to laminate foil layers, such as aluminum foil, to polymer layers to add other desirable properties. Processes for producing these laminates are well known. If two thermoplastics are compatible, they can be combined by coextrusion to form a composite structure or laminated by melting the surfaces of the layers in contact with one another and by applying pressure. If the two thermoplastics are not compatible, they can be made into a laminate by placing an adhesive layer between the incompatible layers.

Many fluoropolymer materials, particularly films formed of poly(chlorotrifluoroethylene) (PCTFE) homopolymers and copolymers, are commonly known for their excellent moisture and vapor barrier properties, and therefore are desirable components of packaging films. Oriented fluoropolymer films have also been shown to exhibit improved moisture barrier properties over non-oriented fluoropolymer films. Methods of making films and film structures from PCTFE polymers and copolymers are known in the art. These are shown, for example, in U.S. Pat. Nos. 6,555,190; 6,432,542; 6,306,503; 5,945,221; 5,874,035; 6,238,607; 6,465,103 and 5,139,878.

U.S. Pat. No. 4,544,721 to Levy discloses stretched or oriented films of PCTFE homopolymers and copolymers. U.S. Pat. No. 4,677,017, which is incorporated herein by reference, discloses coextruded multilayer films which include a fluoropolymer and a thermoplastic film which are joined by the use of an adhesive polymer. U.S. Pat. No. 4,659,625, which is incorporated herein by reference, discloses a fluoropolymer multilayer film structure which utilizes a vinyl acetate polymer adhesive layer. U.S. Pat. No. 5,139,878, which is incorporated herein by reference, discloses a fluoropolymer film structure using an adhesive layer of modified polyolefins.

These films and structures formed therefrom have been used in packaging applications, yet have not heretofore been used in lidding film applications. It is particularly desirable to have a fluoropolymer containing lid for a container which lid has a shape that conforms to the shape of an opening of the container.

SUMMARY OF THE INVENTION

The invention provides a lid for a container, which container has a top opening and a peripheral rim around the opening, which lid comprises a film having a shape which conforms to the shape of the opening when attached to the rim, the film comprising at least one fluoropolymer containing layer.

The invention also provides a package comprising a container having a top opening and a peripheral rim around the opening, and a peelable lid which conforms to the shape of the opening attached around the rim, which lid comprises a composite film having a shape which conforms to the shape of the opening when attached to the rim the film comprising at least one fluoropolymer containing layer.

The invention further provides a process of producing a packaged product which comprises:
a) providing a container having enclosed side walls, a floor and an top opening defining a central cavity, which open top has a peripheral rim,
b) filling the central cavity with a product; and
c) sealing the open top by attaching a peelable lid around a circumference of the rim, which lid comprises a film having a shape which conforms to the shape of the opening when attached to the rim, the film comprising at least one fluoropolymer layer.

DESCRIPTION OF THE PREFERRED EMBODIMENTS

The lid for the present invention comprises a film having at least one at least one fluoropolymer containing layer. The films of the invention are suitable for use on containers and are preferably peelable with good tear propagation properties.

The fluoropolymer layer may be comprised of homopolymers or copolymers or blends thereof as are well known in the art and are described in, for example, U.S. Pat. Nos. 4,510,301; 4,544,721; and 5,139,878. Of these, particularly preferred fluoropolymers suitable to form multilayer barrier films of the present invention include homopolymers and copolymers of chlorotrifluoroethylene, copolymers of ethylene-chlorotrifluoroethylene; copolymers of chlorotrifluoroethylene and vinylidine fluoride; and copolymers of chlorofrifluoroethylene and tetrafluoroethylene. Such copolymers of chlorotrifluoroethylene may contain up to 10%, and preferably up to 8% by weight of the other comonomers such as vinylidine fluoride and tetrafluoroethylene. As used herein, copolymers include polymers having two or more monomer components. Most preferred are chlorotrifluoroethylene homopolymers. Such are available as ACLON® resin from Honeywell International Inc. of Morristown, N.J.

The lid of the invention may also be a multilayered film wherein at least one additional polymer or non-polymer layer is attached to the fluoropolymer layer.

Suitable additional layers non-exclusively include those formed from polyamide homopolymers, polyamide copolymers, polyolefins including linear or branched polyolefin homopolymers, linear or branched polyolefin copolymers, cyclic olefin homopolymers, cyclic olefin copolymers, copolymers of cyclic olefins and linear or branched polyolefin homopolymers, and copolymers of cyclic olefins and linear or branched polyolefin copolymers, ethylene vinyl acetate copolymers, ethylene vinyl alcohol copolymers, polyesters such as polyethylene terephthalate, polyvinyl chloride, polyvinylidene chloride, polystyrene, styrenic copolymers, polyisoprene, polyurethanes, ethylene ethyl acrylate, ethylene acrylic acid copolymers, fluoropolymers and blends of the foregoing materials. The fluoropolymer layer of the invention may also be attached to a non-polymer layer such as a foil, e.g. aluminum foil, or a paper as is known in the art.

Suitable polyamides (nylons) within the scope of the invention non-exclusively include homopolymers or copolymers selected from aliphatic polyamides and aliphatic/aromatic polyamides having a molecular weight of from about 10,000 to about 100,000. General procedures useful for the preparation of polyamides are well known to the art. Such include the reaction products of diacids with diamines. Useful diacids for making polyamides include dicarboxylic acids which are represented by the general formula

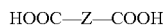

HOOC—Z—COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula

$H_2N(CH_2)_n NH_2$ wherein n has an integer value of 1-16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), nylon 4,6, poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here.

Of these polyamides, preferred polyamides include nylon 6, nylon 6,6, nylon 6/6,6 as well as mixtures of the same. Of these, nylon 6 is the most preferred polyamide.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly (tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

Suitable polyolefins for use herein include polymers of alpha-olefin monomers having from about 3 to about 20 carbon atoms and include homopolymers, copolymers (including graft copolymers), and terpolymers of alpha-olefins. Illustrative homopolymer examples include low density polyethylene (LDPE), ultra low density polyethylene (ULDPE), linear low density polyethylene (LLDPE), metallocene linear low density polyethylene (m-LLDPE), medium density polyethylene (MDPE), and high density polyethylene (HDPE), polypropylene, polybutylene, polybutene-1, poly-3-methylbutene-1, poly-pentene-1, poly-4,4 dimethylpentene-1, poly-3-methyl pentene-1, polyisobutylene, poly-4-methylhexene-1, poly-5-ethylhexene-1, poly-6-methylheptene-1, polyhexene-1, polyoctene-1, polynonene-1, polydecene-1, polydodecene-1 and the like.

Illustrative copolymers and terpolymers include copolymers and terpolymers of alpha-olefins with other olefins such as ethylene-propylene copolymers; ethylene-butene copolymers; ethylene-pentene copolymers; ethylene-hexene copolymers; and ethylene-propylene-diene copolymers (EPDM). The term polyolefin as used herein also includes acrylonitrilebutadiene-styrene (ABS) polymers, copolymers with vinyl acetate, acrylates and methacrylates and the like. Preferred polyolefins are those prepared from alpha-olefins, most preferably ethylene polymers, copolymers, and terpolymers. The above polyolefins may be obtained by any known process. The polyolefins may have a weight average molecular weight of about 1,000 to about 1,000,000, and preferably about 10,000 to about 500,000 as measured by high performance liquid chromatography (HPLC). Preferred polyolefins are polyethylene, polypropylene, polybutylene and copolymers, and blends thereof. The most preferred polyolefin is polyethylene. The most preferred polyethylenes are low density polyethylenes.

Suitable cyclic (cyclo) olefin polymers (homopolymers, copolymers or blends) are described, for example, in U.S. Pat. Nos. 5,218,049; 5,783,273 and 5,912,070, which are incorporated herein by reference. U.S. Pat. No. 5,218,049 discloses films composed of cyclic olefins. U.S. Pat. No. 5,783,273 discloses press-through blister packaging materials comprising a sheet of a cyclic olefin copolymer. U.S. Pat. No. 5,912,070 discloses a packaging material comprising a layer of a cyclic olefin, a layer of a polyester and an intermediate adhesive. In the most preferred embodiment of the invention, the thermoplastic polymer layer 14 comprises a cyclic olefin copolymer. Cyclic olefins may be obtained commercially from Mitsui Petrochemical Industries, Ltd. of Tokyo, Japan, or Ticona of Summit, N.J.

Ethylene vinyl alcohol compounds are well known in the art and readily commercially available. Copolymers of ethylene and vinyl alcohol suitable for use in the present invention can be prepared, for example, by the methods disclosed in U.S. Pat. Nos. 3,510,464; 3,560,461; 3,847,845; 3,595,740 and 3,585,177. The ethylene vinyl alcohol copolymer can be a hydrolyzed ethylene vinyl acetate copolymer. The degree of hydrolysis can range from about 85% to about 99.5%. The ethylene vinyl alcohol copolymer preferably contains from about 15 to about 65 mol percent ethylene and more preferably about 25 to about 50 mol percent ethylene. Copolymers of lower than 15 mol percent ethylene tend to be difficult to extrude while those above 65 mol percent ethylene have reduced oxygen barrier performance. The term "ethylene/vinyl alcohol copolymer" or "EVOH" is intended to comprise also the hydrolyzed or saponified ethylene/vinyl acetate copolymers and refers to a vinyl alcohol copolymer having an ethylene comonomer, which may be obtained, for example, by the hydrolysis of an ethylene/vinyl acetate copolymer or by chemical reaction of ethylene monomers with vinyl alcohol.

In the preferred embodiment of the invention, adjacent layers are attached via an intermediate adhesive layer, also referred to in the art as a "tie" layer, between each film layer. Any conventionally known adhesive material may be used herein. Suitable adhesive polymers include modified polyolefin compositions having at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. Of these, the most preferred is maleic anhydride. The modified polyolefins suitable for use in this invention include compositions described in U.S. Pat. Nos. 3,481,910; 3,480,580; 4,612,155 and 4,751,270. Other adhesive layers non-exclusively include alkyl ester copolymers of olefins and alkyl esters of $\alpha,\beta$-ethylenically unsaturated carboxylic acids such as those described in U.S. Pat. No. 5,139,878. The preferred modified polyolefin composition comprises from about 0.001 and about 20 weight percent of the functional moiety, based on the total weight of the modified polyolefin. More preferably the functional moiety comprises from about 0.05 and about 10 weight percent, and most preferably from about 0.1 and about 5 weight percent. The modified polyolefin composition may also contain up to about 40 weight percent of thermoplastic elastomers and alkyl esters as described in U.S. Pat. No. 5,139,878.

Preferred multilayered lidding films comprise either three or five layered structures, with adjacent layers preferably being attached by an adhesive tie layer. However, multilayered lidding films of the invention are not limited to three or five layer constructions. Particularly preferred three-layer films include a fluoropolymer/adhesive/polyolefin construction where the fluoropolymer is the outermost layer of the lid, which polyolefin, for example, is a polyethylene, polypropylene or cyclic olefin homopolymer or copolymer, and a fluoropolymer/adhesive/polyamide construction with the fluoropolymer being the outermost film layer, which polyamide, for example, is a nylon 6, nylon 6,6 or nylon 6,6,6 polymer. Other preferred constructions include, for example, fluoropolymer/adhesive/polyvinyl chloride and fluoropolymer/adhesive/polyvinylidene chloride. Also preferred are five-layer constructions such as fluoropolymer/adhesive/polyolefin or polyamide/adhesive/fluoropolymer, fluoropolymer/adhesive/polyolefin or polyamide/adhesive/polyolefin or polyamide, etc. Preferably at least one of the outer layers has a printable surface. Such constructions are simply exemplary and non-limiting, and each or the layers within multilayered constructions of the invention may comprise generally any polymeric or non-polymeric material that is suitable for use in a multilayered film so long as at least one film layer comprises a fluoropolymer containing layer. Thus, the film laminate has at least three layers, and may comprises four, five or more layers as desired by the skilled artisan.

Each of the layers of the lidding film of the invention may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 10% by weight of the overall layer composition. Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

The lid of this invention can be formed by any conventional technique for forming films, including lamination and coextrusion. In the most preferred method, the multilayered films are formed by coextrusion. For example, the material for the individual layers are fed into infeed hoppers of the extruders of like number, each extruder handling the material for one or more of the layers. The melted and plasticated streams from the individual extruders are fed into a single manifold co-extrusion die. While in the die, the layers are juxtaposed and combined, then emerge from the die as a single multiple layer film of polymeric material. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. The temperature of the various rolls are selected to achieve the desired properties of the film and are also based on the type of polymer employed. Typically, the first casting roll temperature is in the range of about 50 to about 250° F. (10 to 121° C.), preferably in the range of about 75 to about 200° F. (24 to 93° C.), and more preferably in the range of about 100 to about 175° F. (38 to 79° C.). The temperature of the second controlled temperature roll (also called a preheat roll) is typically in the range of about 50 to about 250° F. (10 to 121° C.), preferably in the range of about 75 to about 200° F. (24 to 93° C.), and more preferably in the range of about 100 to about 175° F. (38 to 79° C.). The temperature of the rolls need not be the same. A cool roll may be employed to provide dimensional stability to the film. Typically, the temperature of this roll is in the range of about 50 to about 300° F. (10 to 149° C.), preferably in the range of about 100 to about 250° F. (38 to 121° C.), and more preferably in the range of about 150 to about 225° F. (66 to 107° C.).

In another method, the film forming apparatus may be one which is referred to in the art as a "blown film" apparatus and includes a multi-manifold circular die head for bubble blown film through which the plasticized film composition is forced and formed into a film "bubble which may ultimately be collapsed and formed into a film. Processes of coextrusion to form film and sheet laminates are generally known. See for example in "Modern Plastics Encyclopedia", Vol. 56, No. 10A, pp. 131-132, McGraw Hill, October 1979.

Alternatively the individual layers may first be formed as separate layers and then laminated together under heat and pressure with or without intermediate adhesive layers. Lamination techniques are well known in the art. Typically, laminating is done by positioning the individual layers on one another under conditions of sufficient heat and pressure to cause the layers to combine into a unitary film. Typically the individual layers are positioned on one another, and the combination is passed through the nip of a pair of heated laminating rollers by techniques well known in the art. Lamination heating may be done at temperatures ranging from about 120° C. to about 175° C., preferably from about 150° C. to about 175° C., at pressures ranging from about 5 psig (0.034 MPa) to about 100 psig (0.69 MPa), for from about 5 seconds to about 5 minutes, preferably from about 30 seconds to about 1 minute.

The films of this invention may optionally be stretched or oriented in any direction, if so desired, using methods known to those of skill in the art. In such a stretching operation, the film may be stretched in either the direction coincident with the direction of movement of the film being withdrawn from the casting roll, also referred to in the an as the "machine direction", i.e. the direction which is perpendicular to the machine direction, and referred to in the art as the "transverse direction" where the resulting film is "uniaxially" oriented; or the machine direction as well as in the transverse direction, where the resulting film is "biaxially" oriented. Typically for use in the present invention, the oriented film formed from the composition of the invention are preferably produced at draw ratios of from about 1.5:1 to about 10:1, and preferably at a draw ratio of from about 1.5:1 to about 4:1. The term "draw ratio" as used herein indicates the increase of dimension in the direction of the draw. Therefore, a film having a draw ratio of 2:1 has its length doubled during the drawing process. Generally, the film is drawn by passing it over a series of preheating and heating rolls. The heated film moves through a set of nip rolls downstream at a faster rate than the film entering the nip rolls at an upstream location. The change of rate is compensated for by stretching in the film.

Typical process and range of conditions for monoaxially oriented polyamide films are disclosed, for example, in U.S. Pat. No. 4,362,385. The film laminate of the present invention can be biaxially oriented using blown tube apparatus, or a tenter frame apparatus, and can either be sequentially or simultaneously oriented biaxially. The film laminate of the present invention can also be embossed after orientation.

The films of this invention may have any desired thickness. For example, the film may have a thickness after orientation of from about 0.1 mil (2.5 µm) to about 15 mil (381 µm), more preferably from about 0.2 mil (5.1 µm) to about 5 mil (127 µm), and most preferably from about 0.5 mil (12.7 µm) to about 2 mil (50.8 µm). While such thicknesses are referenced, it is to be understood that other layer thicknesses may be produced to satisfy a particular need and yet fall within the scope of the present invention. The thickness of the film before stretching is selected such that the desired thickness after stretching is achieved, based on the stretch ratio employed, as is known in the art.

The water vapor transmission rate (WVTR) of such films of the invention may be determined via the procedure set forth in ASTM F1249. In the preferred embodiment, the film according to this invention has a WVTR per mil of film preferably less than about 0.05 or less g/100 in$^2$/day (0.775 g/m$^2$/day) at 37.8° C. and 100% RH, more preferably less than about 0.03 g/100 in$^2$/day (0.465 g/m$^2$/day), and most preferably less than about 0.015 g/100 in$^2$/day (0.233 g/m$^2$/day), as determined by water vapor transmission rate measuring equipment available from, for example, Mocon. Preferably, the films of this invention have water vapor transmission rates that are at least less than about 20%, more preferably at least less about 25% and most preferably at least less than about 30%, of the water vapor transmission rates of similar films which are unoriented.

The lidding films of the invention also preferably have good oxygen barrier properties at 90% relative humidity (RH). Oxygen barrier resistance may be measured using the procedure of ASTM D-3985. In general, using the aforesaid method, the films of this invention have an oxygen transmission rate ($O_2$ TR) at 90% relative humidity equal to or less than about 0.5 cm$^3$/100 in$^2$ (645 cm$^2$)/24 hrs/Atm at 23° C. Preferably the lid film has a oxygen transmission rate less than or equal to that of the container stock. The superior oxygen barrier properties of the lidding of this invention makes them especially useful in food lid applications.

In order to produce a food container lid, a sheet of the film is cut, preferably die cut to the desired size and shape. Preferably the lid has a pull tab in order to ease finger peeling removal. Preferably the film is opaque and is embossed. The lid should have that amount of thickness and stiffness to allow easy peel off of the container to which it is attached without tearing.

The invention further comprises a package comprising a cup shaped container having enclosed side walls, a floor and an top opening defining a central cavity, which open top has a peripheral rim, and the above described peelable lid which conforms to the shape of the opening attached around the rim. The rim is preferably either substantially flat or contoured, but may be any shape suitable for the attachment of a lidding film thereon. The container may comprise a material such as cardboard, paperboard, boardstock, a plastic and combinations thereof. Preferred plastics include any one of several thermosetting or thermoplastic resins any of which are capable of sealing to the lidding material. Examples of materials include acrylonitrile, an acrylic polymer, polyethylene terephthalate (PET), polyvinyl chloride, polycarbonate, copolymers of "PET", polystyrene and polypropylene.

The lid can be heat sealed such as by means of a heat sealable material placed around a peripheral edge of the lid for attaching to the rim of a container. The lid can be adhered to the rim of the container by means of an adhesive, such as a thermoplastic hot melt adhesive, for example a layer of a petroleum wax-ethylene vinyl acetate or any suitable polyolefin copolymer composition which serves as an heat activated adhesive or sealant material when subsequently subjected to heat and pressure by the packer. Typically, after the container has been filled, the lid is pressed against the container rim as heat and pressure are applied to provide a peelable seal therebetween.

A significant advantage of the package of the present invention is that the complete package is less expensive to produce than conventional prior art packages, and it still provides excellent sealing equalities for a packaged product to extend its shelf life. Also, it is adapted to facilitate easy opening by the consumer, who can quickly peel the lid from the container to open the package.

In use, the cup shaped container as described above is filled through its central cavity with a product such as a food through the open top. The top is then closed by sealing the open top by attaching the peelable lid around the rim. Alternately, the cup may be filled with the product after the lid is adhered to the container, whereby the container is subsequently sealed by means other than a lid. While it is contemplated that the container will hold a food product, it could just as well hold a pharmaceutical composition, an electronic component or a medical device.

The following non-limiting examples serve to illustrate the invention.

EXAMPLE 1

An oriented 1 mil PCTFE (Aclon® HP1120 from Honeywell International), homopolymer layer, extrusion coated with a 1 mil layer of ethylene acrylic acid (EAA), is heat sealed to a push through PVC blister package after a unit oral dose has been placed in the blister cavity. The PCTFE/EAA lidstock is sealed to the blister sheet at temperatures of 225° F. to 290° F., providing a clear, flex crack resistant moisture barrier for the contents of the blister.

EXAMPLE 2

A three-layer multilayer film is coextruded from PCTFE homopolymer (Aclon® HP1120), a polyolefin plastomer tie layer and a linear low density polyethylene. The linear low density polyethylene is sealed to a thermoformed tray providing a transparent, puncture resistant moisture barrier for a medical device.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A package comprising a container having a top opening and a peripheral rim around the opening, and a peelable lid which conforms to the shape of the opening attached around the rim, which lid comprises a composite film having a shape which conforms to the shape of the opening when attached to the rim the film comprising at least one fluoropolymer containing layer, and said film having an oxygen transmission rate at 90% relative humidity equal to or less than about 0.5 $cm^3/100$ $in^2$ (645 $cm^2$)/24 hrs/Atm at 23° C.

2. The package of claim 1 which film comprises a multilayered film comprising at least one polymer layer attached to said fluoropolymer layer, which layers are optionally joined via an intermediate adhesive tie layer.

3. The package of claim 2 wherein said at least one polymer layer comprises a material selected from the group consisting of fluoropolymers, polyamide homopolymers, polyamide copolymers, polyolefins, cyclic olefin homopolymers and copolymers, ethylene vinyl alcohol copolymers, ethylene vinyl acetate copolymers, polyesters, polyethylene terephthalate, polyvinyl chloride, polyvinylidene chloride, polystyrene, styrenic copolymers, polyisoprene, polyurethanes, ethylene ethyl acrylate, ethylene acrylic acid copolymers and combinations thereof.

4. The package of claim 2 wherein said multilayered film comprises a plurality of polymer layers attached to said fluoropolymer layer, wherein adjacent layers are optionally joined via an intermediate adhesive tie layer.

5. The package of claim 2 wherein the film is produced by coextrusion.

6. The package of claim 2 wherein the film is produced by lamination.

7. The package of claim 1 wherein said fluoropolymer layer comprises a chlorotrifluoroethylene homopolymer or a poly(chlorotrifluoroethylene) containing copolymer.

8. The package of claim 1 wherein the film is oriented.

9. The package of claim 1 wherein the lid is attached to the rim of the container by means of a heat sealable material around a peripheral edge of the lid.

10. The package of claim 1 wherein the lid is attached to the rim of the container by means of an adhesive around a peripheral edge of the lid.

11. The package of claim 1 which contains a product.

12. The package of claim 1 which contains a product which comprises a food, a pharmaceutical composition, an electronic component or a medical device.

13. The package of claim 1 which container comprises a blister package.

14. A process of producing a packaged product which comprises:
   a) providing a container having enclosed side walls, a floor and an top opening defining a central cavity, which open top has a peripheral rim,
   b) filling the central cavity with a product; and
   c) sealing the open top by attaching a peelable lid around a circumference of the rim, which lid comprises a film having a shape which conforms to the shape of the opening when attached to the rim, the film comprising at least one fluoropolymer layer, and said film having an oxygen transmission rate at 90% relative humidity equal to or less than about 0.5 $cm^3/100$ $in^2$ (645 $cm^2$)/24 hrs/ Atm at 23° C.

15. The process of claim 14 wherein the product is a food.

16. The process of claim 14 wherein said film further comprises at least one polymer layer attached to said fluoropolymer layer, which layers are optionally joined via an intermediate adhesive tie layer.

* * * * *